INVENTOR.
Friedrich-Wilhelm HÖFER

United States Patent Office 3,623,301
Patented Nov. 30, 1971

3,623,301
CONTROL APPARATUS FOR THE CUTTING PLATFORM OF A HARVESTING MACHINE
Friedrich-Wilhelm Höfer, Hofingen, Germany, assignor to Robert Bosch GmbH, Stuttgart, Germany
Filed July 2, 1970, Ser. No. 51,952
Claims priority, application Germany, July 23, 1969,
P 19 37 346.7
Int. Cl. A01d *67/00*
U.S. Cl. 56—10.4          13 Claims

ABSTRACT OF THE DISCLOSURE

The level of the cutting platform of a harvesting machine on or above ground is determined by setting potentiometers to a desired pressure in the lifting motor of the platform, and to a desired position of the same. When the set pressure or platform position is different from the actual pressure or position, as represented by other potentiometers, voltage differentials are produced and compared, and a lifting motor is accordingly controlled.

While the cutting platform rests on the ground, the lifting motor carries a selectable part of the weight of the platform. When the actual pressure in the lifting motor approaches in this position a maximum, a control switch is actuated and control means render the position representing potentiometers operative so that the maximum pressure is used for lifting and maintaining the platform above ground. The platform can be provided with ground contour feelers so that a platform level above, but near the ground, is automatically controlled in accordance with the feeler position.

BACKGROUND OF THE INVENTION

In hydraulic lifting apparatus of this type, it may happen that, when the cutting platform encounters an obstacle, the control of the pressure is influenced by the position of the platform, or by the position of feelers on the platform, so that the pressure control is not fully effective. When the cutting plaform encounters an obstacle, a part of the weight of the platform is supported on the ground, and the pressure in the hydraulic lifting motor of the platform rises so that means for representing the actual pressure are operated and no longer have the effect of a rigid linkage, but as a pressure selector which transmits the influence of the pressure variation to control means. When the level of the platform is manually selected, for example within the range of ground contour feelers, the feelers which do not sense the obstacle, have a controlling influence which counteracts the influence of the pressure responsive means, and by which the control means are actuated to lower the platform so as to reduce the influence of the pressure regulation.

SUMMARY OF THE INVENTION

It is one object of the invention to provide a control apparatus for the cutting platform of a harvesting machine in which the position of the platform, or of feelers on the platform, has no influence until shortly before the maximum pressure is obtained in the hydraulic lifting motor of the platform.

A related object of the invention is to provide control apparatus which during regulation of the pressure in the lifting motor, is not influenced by the position selected for the platform.

Another object of the invention is to provide control apparatus in which the pressure can be manually regulated while the platform rests on the ground, while the level of the platform above the ground is manually regulated while the pressure in the lifting motor of the platform remains at a constant maximum value.

With these objects in view, a control apparatus according to the invention provides a mechanical, hydraulic, or electric device which cooperates with the pressure responsive device, and can be connected by means of a position representing device with the control means and the position selecting means only when the pressure responsive device has assumed a position near the position of maximum pressure.

One embodiment of the invention comprises a movable cutting platform mounted for up and down movement; a hydraulic motor for raising the platform; hydraulic operating means having a first position for supplying fluid to the hydraulic motor for raising the platform and having a second position for discharging fluid from the hydraulic motor for lowering the platform; actual pressure representing means responsive to the pressure in the hydraulic motor; desired pressure representing means manually settable for representing a pressure desired in the hydraulic motor up to a maximum pressure; actual position representing means connected with the platform and responsive to positions of the same; desired position representing means manually settable to a position desired of the platform; comparison means for comparing the condition of the actual pressure representing means with the condition of the desired pressure representing means, and controlling the hydraulic operating means to control the hydraulic motor until the actual pressure in the hydraulic motor is equal to the desired pressure seleced by manual operation of the desired pressure representing means.

Thereupon, the hydraulic operating means is deactivated by the comparison means.

In accordance with the invention, control means operated by the actual pressure representing means connect the actual position representing means and the desired position representing means with the comparison means, when the actual pressure representing means represents a predetermined pressure which is a given amount less than the maximum pressure to which the desired pressure representing means is manually set. Consequently, the comparison means now compares the actual position of the platform with the desired position of the same and controls the hydraulic operating means to actuate the hydraulic motor until the actual position of the platform is the same as the desired position selected by operation of the desired position representing means.

In the preferred embodiment of the invention the control means includes a control switch operated by the actual pressure representing means to move to an actuated position when the same responds to the predetermined pressure. Relay means are controlled by the control switch in its normal position to connect the actual pressure representing means and the desired pressure representing means with the comparison means. In the actuated position of the control switch, the relay means connects the actual position representing means and the desired position representing means with the comparison means.

The actual pressure representing means, and the desired pressure representing means, and also the actual position representing means and the desired position representing means are preferably potentiometers which produce different electric voltage differentials when the actual pressure and desired pressure, and the actual position and the desired position of the platform are different. The comparison means is preferably also a relay controlling electromagnetic means responding to voltage differentials to move the hydraulic operating means between a position for raising the platform, and a position for lowering the platform. The hydraulic operating means preferably include a pump, and a valve shifted by the electromagnetic means between different positions for supplying fluid from the pump to the hydraulic lifting motor, or for discharging fluid from the same.

In another embodiment of the invention, feelers are provided on the platform for sensing the ground contour within a limited range. Actual feeler position representing means, and desired feeler position representing means are provided in addition to the actual platform position representing means and the desired platform position representing means. The latter are correlated with high platform positions above the operational range of the feelers.

Preferably, two feelers are mounted on the platform for independent movement, and are connected by linkages with the actual feeler position representing means. The arrangement includes means whereby the actual feeler position representing means represents the greater deviation of the deviations of the two feelers caused by the ground contour.

The novel features which are considered as characteristic for the invention are set forth in particular in the appended claims. The invention itelf, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
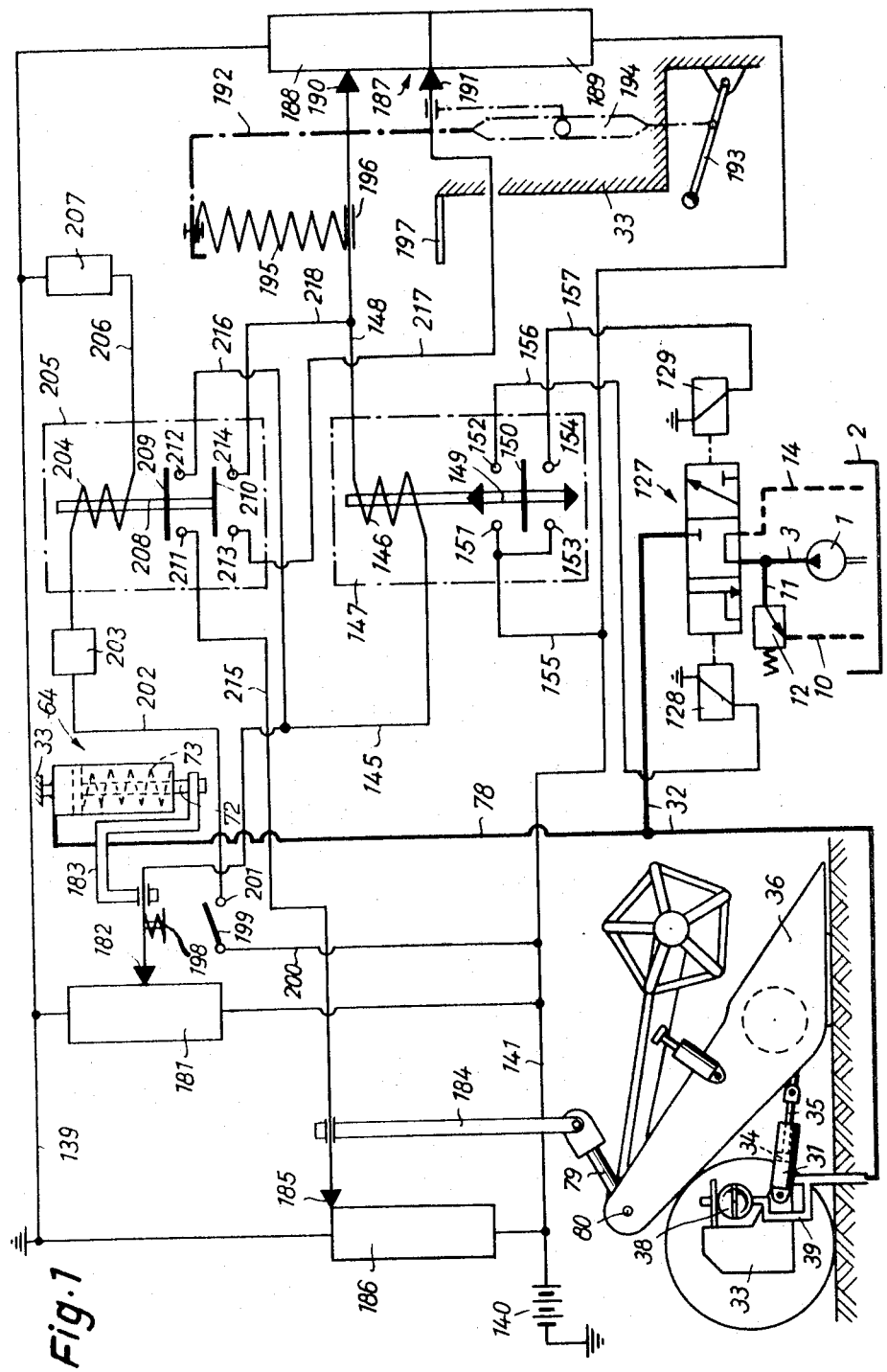
FIG. 1 is a schematic and diagrammatic view illustrating a control apparatus according to the invention, together with a schematic view of the harvesting machine at a reduced scale.
Figure 2:
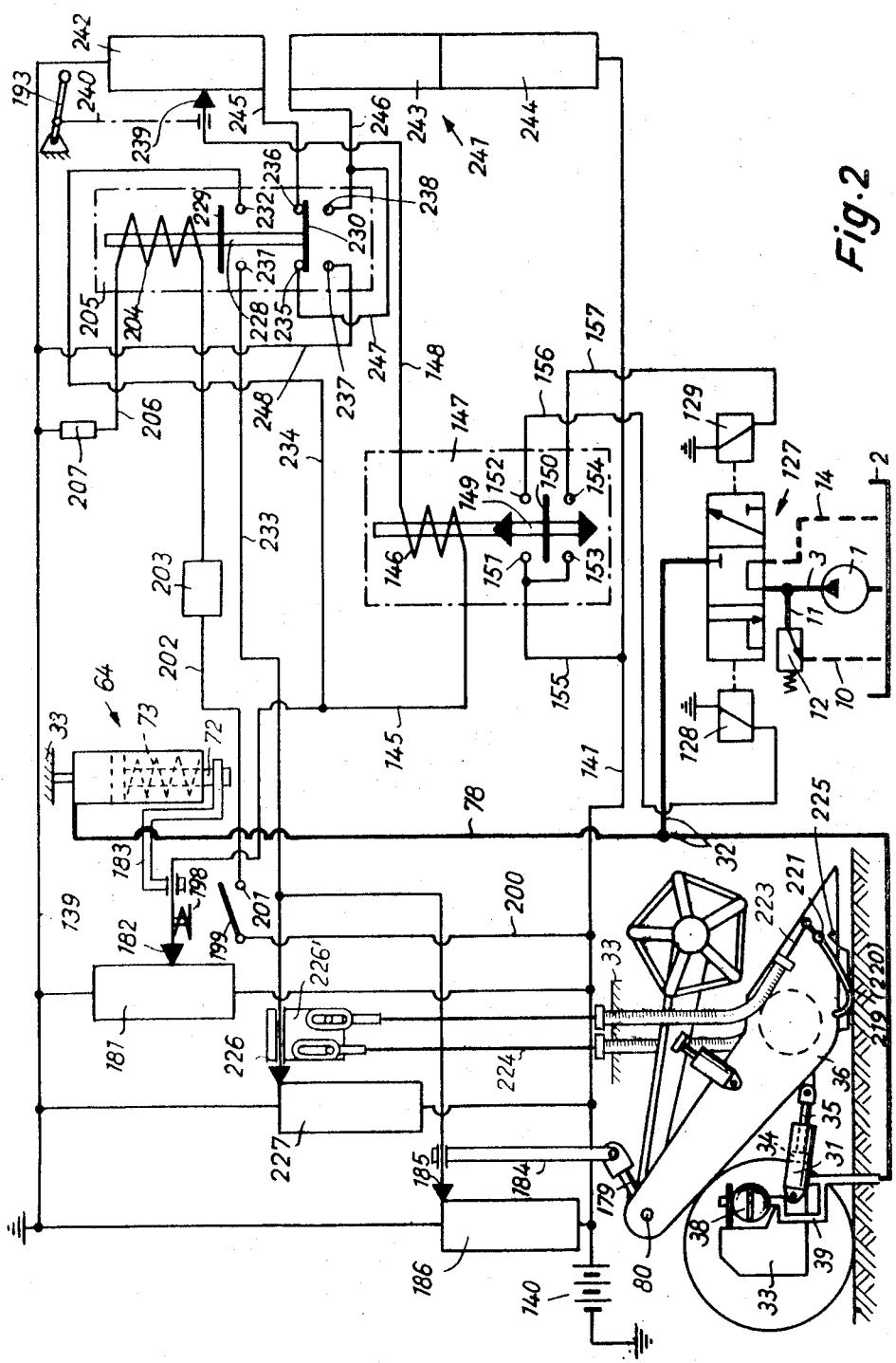
FIG. 2 is a schematic and diagrammatic view corresponding to FIG. 1 but illustrating a second embodiment of the invention.

Corresponding parts in FIGS. 1 and 2 are designated by like reference numerals. Referring now to FIG. 1, a harvesting machine has hydraulic operating means including a pump 1 which sucks fluid from a container 2 and pumps the fluid into a pressure conduit 3 connected with a control valve 127. Pressure conduit 3 has a branch conduit 11 provided with a pressure limiting valve 12, and ending in a return conduit 10 discharging into container 2. A return conduit 14 from valve 127, also discharges into container 2.

Valve 127 has three positions which are schematically illustrated, and in the middle position of valve 127, pressure conduit 3 is connected with the return conduit 14 by valve 127, as shown in FIG. 1. An operating conduit 32, which is closed in the middle position of valve 127, is connected with the hydraulic lifting motor 31 which is pivotally mounted on the frame 33 of the harvesting machine, and has a lifting piston 34 for operating piston rod 35 pivotally connected with the cutting platform 36 which is turnable about a shaft 80 together with a lever arm 79 to which a link 184 is pivotally connected, as schematically indicated in FIG. 1. A pressure fluid accumulator 38 is connected by a conduit 39 to the operating conduit 32, and constitutes a resilient element in the same. Valve 127 is operated by a first electromagnetic means 128 to move to the left, and by a second electromagnetic means 129 to move to the right, as viewed in FIG. 1, so that valve 127 establishes other connections. Electromagnetic means 128, and the right-end portion of valve 127 are associated with the upward movement of platform 36 by hydraulic lifting motor 31, and electromagnetic means 129 and the left valve portion of valve 127 are associated with the lowering of platform 36.

When electromagnetic means 128 is energized as will be described hereinafter, the right valve end portion connects pressure conduit 3 with operating conduit 32, while return conduit 14 is closed, and consequently piston 35 is operated to raise platform 36.

When electromagnetic means 129 is energized, the operating conduit 32 is connected by the left-end portion of the valve with the return conduit 14, so that pressure fluid can be discharged from hydraulic motor 31 into container 2 whereby the platform 36 is lowered. At the same time, pressure conduit 3 is also connected with return conduit 14.

Actual pressure representing means responsive to the pressure in the cylinder of hydraulic lifting motor 31 are provided and include a pressure responsive means 64 having a cylinder connected by conduit 78 with the cylinder of hydraulic lifting motor 31, a piston and piston rod 72, a spring 73 biassing the piston, and means for securing the cylinder to the stationary frame 33. Consequently, when the pressure in hydraulic motor 31 varies, piston and piston rod 72 assume a corresponding position, in which the length of the pressure responsive device is varied so that a linking means 183 moves the movable tap 182 over a potentiometer resistor 181 which is connected between a voltage source 140 and a conductor 141, and a conductor 139 connected to ground. The position of tap or slide 182 represents the actual pressure in hydraulic lifting motor 31. The uppermost position of tap 182 corresponds to the lowest pressure, and the lowest position corresponds to the maximum pressure.

In addition to the actual pressure representing means, actual position representing means are provided which include the linkage 79, 184, the movable tap or slide 185 which is moved by the linkage 184, 79 along a potentiometer resistor 186 which is connected to the voltage between lines 139 and 141. The position of tap 185 shown in FIG. 1 corresponds to the highest position of the platform 36, while a position of tap 185 at the lower end of resistor 186 corresponds to the lowest position of the platform 36 in which the same may rest on the ground.

Desired pressure representing means include a potentiometer resistor 188 corresponding to resistor 181, and a movable tap or slide 190 is mounted on a spring 195 on a linkage 192 which is pivotally connected with a manually operated lever and handle 193. A fixed stop 197 is secured to frame 33, as schematically shown, and cooperates with an abutment member 196 at the end of spring 195 carrying tap 190. When handle 193 is turned in counterclockwise direction as viewed in the drawing, the linkage 192 is moved with spring 195 and abutment 196 together with tap 190 along resistor 188 until at the lower end of resistor 188, abutment 196 abuts stop 197 so that tap 190 cannot move any further. The uppermost position of tap 190 represents low pressure, and the lowermost position of tap 190 represents the maximum pressure which can be selected on the desired pressure representing means 190, 188.

Desired position representing means are provided in the form of potentiometer resistor 189 cooperating with tap 91 which is mounted in the elongated slot 194 of linkage 192. During movement of tap 190, tap 191 is also moved by the linkage 194 since tap 191 is fixedly secured in slot 194 which may be used for adjusting the relative position between taps 191 and 190 before the operation.

When tap 190 has been manually moved to its lowest position representing the highest selected and desired pressure in lifting motor 31, it is stopped, as explained above, and further movement of handle 193 causes movement only of tap 191 until the same moves to the lower end of resistor 189, representing the highest position above ground of frame 36.

As will be explained in greater detail hereinafter, different pressures are selected by manual operation of tap 190, and such desired pressures are obtained in hydraulic motor 31 so that the actual pressure representing means 181, 182, 183 and 64 represent the same pressure. In the same manner, desired positions of the platform are selected by operation of tap 191, and after the platform has been raised, the actual pressure representing means 186, 185 assume a corresponding position.

Every position of tap 190 along potentiometer resistor 188, corresponds to a pressure change in hydraulic motor 31 while platform 36 rests on the ground so that a greater or smaller part of the weight of the platform is sustained by hydraulic motor 31, while the remainder of the weight is supported on the ground. When tap 191 is moved along potentiometer resistor 189, the platform 36 is raised above ground while maximum pressure prevails in the lifting motor 31. In the lowest position of tap 191, the platform 36 is raised high for transport in an inoperative position.

The slide or tap 182 of the actual pressure representing means is connected by an electrical line 145 with one end of a winding 146 of a relay 147, whose other end is connected by a line 148 with top 190. Resistors 188 and 189 are connected between the lines 139 and 141 to which the voltage of source 140 is applied. Relay 147 is polarized and has an armature 149 with a connector bridge 150 which, if there is no voltage differential between slides 182 and 119, assumes the illustrated disconnecting position spaced from two pairs of contacts 151, 152, and 154. Contacts 151 and 153 are connected by a line 155 and line 141 with the voltage source 140. Contact 152 is connected by a line 156 with the winding of electromagnetic means 128, and contact 154 is connected by line 157 with a winding of electromagnetic means 129. The electromagnetic means 128 and 129 shift valve 127, as explained above, so that the operating means 127, 1 cause pumping of fluid into hydraulic motor 31, or discharge of fluid from the same for lowering the platform.

On the slide 182, or on the linkage 183, or on piston rod 72, an actuator 198 is mounted which cooperates with a normally open control switch 199 when tap 182 assumes a position on resistor 181 near its lower end and slightly before its end position, corresponding to a maximum pressure, is reached. When tap 190 is moved by the manually operated means 193, 192 to its lower end position on resistor 188, representing a desired maximum pressure, tap 182 will move to a corresponding position, but before reaching this end position, actuator 198 will close control switch 199 which engages contact 201 connected by a line 202 with a delaying device, such as a capacitor 203. Line 202 is connected at one end of the winding 204 of a relay 205 whose other end is connected by line 206 with the resistor 207. The control means 199 and 201 to 207 are connected between the voltage line 141 and the ground connected line 139 so that a current flows throguh winding 204 when control switch 199 is closed by actuator 198.

Control relay 205 has an armature 208 with two contact bridges 209 and 210 which, when control switch 199 is in its normal open position, assumes the illustrated position in which no connection is established between contacts 211 and 212, and contacts 213 and 214.

Contact 211 is connected by line 215 to the slide or tap 185 of the actual position representing potentiometer 186, 185, and contact 212 is connected by a line 216 with line 145, while contact 213 is connected by a line 217 with the slide 191 of the desired position representing potentiometer 191, 189. Contact 214 is connected by a line 218 to line 148 which connects tap 190 with winding 146 of relay 147.

Control switch 199, 201, and control relay 205 are part of control means by which comparison means including relay 147 and electromagnetic means 128, 129 are operated to compare the condition of the desired position representing means 191 189 with the condition of the actual position representing means 186, 185.

The apparatus illustrated in FIG. 1 operates as follows:

Assuming that the platform 36 is in the highest transporting position, tap 185 is in the highest position, representing the actual position of the platform, as shown in FIG. 1. When the driver operates handle 293 to select a desired position and height of the platform, linkage 192 is displaced so that slide 190 may be shifted from its previous position to the position shown in FIG. 1 substantially located in the middle of the resistor 188, and representing a desired pressure. Slide 191 is placed in the illustrated position at the upper end of resistor 189 corresponding to the lowest position of the platform 36.

In this condition of the potentiometers, a voltage differential occurs between the slides 182 and 190 since slide 190 represents a medium pressure selected by the operator, while slide 182 represents the actual high pressure. Due to the voltage differential, a current flows from slide 182 of the actual pressure representing potentiometer to slide 190 of the desired pressure representing potentiometer through lines 145, 148 and winding 146 of comparison relay 147. A magnetic field is formed by winding 146 so that armature 149 is moved out of winding 146 and contact bridge 150 connects contacts 153, 154 so that the electromagnetic means 129 is energized by being connected by lines 157, 155, 141 with the voltage source 140. Valve 127 is moved to the right to a position in which its left end portion, as schematically shown, connects operating line 32 with return conduit 14 so that fluid is discharged from hydraulic motor 31 into container 2, and the platform 36 moves downward.

At the same time, the pressure in the cylinder of hydraulic motor 31 drops so that the actual pressure representing means including pressure responsive device 64 and actual pressure representiing potentiometer 182, 181 assume the position in which tap 182 is positioned in the same manner on resistor 181 as tap 190 is positioned on resistor 188. Since the voltage differential is thus eliminated, no current flows between taps 182 and 189, and the magnetic field of winding 146 collapses so that armature 149 and contact bridge 150 moved to the inoperative intermediate position shown in FIG. 1. Contacts 153 and 154 are again separated, so that electromagnetic means 129, which causes downward movement of platform 36, is no longer energized, permitting valve 127 to return to the neutral central position shown in FIG. 1. In this position of the valve, the cylinder of hydraulic motor 31 is again closed, so that no pressure fluid can escape from hydraulic motor 31, and the cutting platform 36 rests on the ground, sliding on the same while partly supported by hydraulic motor 31.

Since tap 182, and link 183 of pressure responsive means 64 have moved with actuator 198 away from switch 199, the same opens, and interrupts the connection from the voltage source 140 and line 141 to the winding 204 of the control relay 205.

Slide 191 of the desired position representing potentiometer 191, 189 has been shifted together with slide 190 by manually operated means 193, 192 to the position corresponding to the lowest position of platform 36. Since the operation of valve 127 permitted discharge from hydraulic motor 31, the platform 36 has moved downward until resting on the ground, and the linkage 79, 184 has performed a corresponding movement, displacing tap 185 on resistor 186 to the other end position corresponding to the lowest position of the platform. Taps 185 and 191 are thus in corresponding positions representing desired and actual lowest positions of platform 36.

During cutting operations, it is desired that the cutting platform does not slide on the ground, but is supported by hydraulic motor 31 at a constant given height above the ground. To obtain this condition, the driver operates handle 193 to select the desired height and level of the platform by a dial, not shown, so that slide 191 is shifted to a position representing the desired position of platform 36. Linkage 192 moves slide 190 through spring 195 so that slide 190 assumes the position corresponding to maximum pressure represented by the desired pressure representing potentiometer 190, 188, while abutment 196 abuts stop 197 on frame 133. The spring 195 holds slide 190 in this position. This position of slide 190 on resistor 188 is different from the position of slide 182 on the actual pressure representing potentiometer 181, so that a voltage differential is produced between slides 182 and 190, and a current flows through winding 146 in the opposite direction than before, from slide 190 of the desired pressure representing potentiometer to slide 182 of the actual pressure representing potentiometer. The magnetic field of winding 146 of comparison relay 147 pulls armature 149 into winding 146 so that contact bridge 150 connects contacts 151 and 152 so that the electromagnetic means 128 is connected by lines 156, 155 and 141 with the voltage source 140, and is energized to displace valve 127 to the left as viewed in FIG. 1 so that the pressure conduit 3 of pump 1 is connected by the right end portion of valve 127, as schematically shown, with the operating conduit 32 for pumping fluid into the cylinder of the hydraulic lifting motor 31, resulting in lifting of platform 36.

Due to the pressure change in hydraulic motor 31, the pressure responsive means 64 operates its piston and piston rod 72 to assume a position representing the actual pressure in hydraulic motor 31. Slide 182 of the actual pressure representing potentiometer 181, 182 is displaced toward the maximum pressure in downward direction as viewed in FIG. 1. Shortly before the slide 182 reaches the end position selected by setting of slide 190 to maximum desired pressure, actuator 198 engages switch arm 199 of control switch 199, 201, and closes the same. Thereupon, slide 182 moves further to the end position at the lower end of resistor 181, corresponding to the position of the slide 190. When both slides are in the end positions, the voltage differential is eliminated, so that no current flows through winding 146.

When the maximum actual pressure is reached, the pressure responsive means 64 has arrived in a corresponding position in which piston and piston rod 72, together with linkage 183 are in an end position in which spring 73 is completely compressed, and the device 64 acts as a rigid connection between frame 33 and linkage 183 with actuator 198 and tap 182. In this condition of the apparatus, the entire weight of platform 36 is supported by hydraulic motor 31.

When control switch 199 is closed, the control circuit 200 to 207 is connected by line 141 with voltage source 140, so that a current flows from voltage source 140 to the grounded line 139 through lines 141, 200 and 202, the delaying capacitor 203, winding 204 of control relay 205, line 206, and constant resistor 207. A magnetic field is produced by winding 204 which moves armature 208 out of winding 204 so that contact bridges 209 and 210 close contacts 209, 211 and 210, 212.

The slide 185 of the actual position representing potentiometer 186, 185 is connected by lines 215, 216 and 145 to the winding 146 of comparison relay 147, while the slide 191 of the desired position representing potentiometer 191, 189 is connected by lines 217, 218 and 148 also with winding 146 of comparison relay 147.

Since slide 191 of the desired position representing potentiometer has a position relative to resistor 189 which is different from the position of slide 185 of the actual position representing potentiometer, and to resistor 186 thereof, a voltage differential is created between the slides 191 and 185 so that a current flows from slide 191 to slide 185. This new current energizes the winding 146 of comparison relay 147, so that armature 149 is retained in winding 146, since shortly before slide 182 reached the position of maximum pressure selected by slide 191, actuator 198 has closed switch 199, 201.

The pumping of pressure fluid into the hydraulic lifting motor 31 by pump 1 is continued, and platform 36 is further lifted. The arm 79 and link 184 transmit the motion of platform 36 to slide 185 so that the same moves along resistor 186 successively to positions representing the actual position of platform 36 until slide 185 has a position relative to resistor 186 corresponding to the position of slide 191 on resistor 189, so that no voltage differential prevails between slides 185 and 191, and winding 146 is de-energized. The magnetic field of winding 146 collapses, and armature 149 with contact bridge 150 moves back to the illustrated neutral position in which contacts 151 and 152 are again separated so that electromagnetic means 128 is de-energized, and control valve 127 returns to the illustrated neutral position in which the hydraulic motor 31 cannot discharge or receive fluid, and holds platform 36 at the desired and manually selected level corresponding to the selected position of handle 193 and the position of slide 191 and 185 on the respective resistors 189 and 186.

When the platform 36, moving at a seelcted level above ground, meets an obstacle, a part of the weight of platform 36 is supported by the ground, and the pressure in hydraulic motor 31, and in the pressure responsive means 64, drops. Spring 73 moves piston and piston rod 71 with link 83 to displace slide 182 of the actual pressure representing potentiometer 181, 182 from the position of highest pressure to the new actual lower pressure in hydraulic motor 31. Actuator 198 moves with the slide 182 and linkage 183 away from switch 199, so that the same opens, and disconnects the control circuit 200 to 207. The magnetic field of winding 204 of control relay 205 collapses, armature 208 is drawn into winding 204, and contacts 211, 212 and 213, 214 are disconnected by the contact bridges 209 and 210. Slide 185 of the actual position representing potentiometer, and slide 191 of the desired position representing potentiometer are disconnected. Slide 190 of the desired pressure representing potentiometer remains in its previous position corresponding to the highest desired pressure. Between slides 190 and 182, which are in different positions, a voltage differential is produced, so that winding 146 is energized, and comparison relay 147 effects energization of electromagnetic means 128, in the manner described above, so that valve 127 of the hydraulic operating means 127, 1, 3, 10, 14 is operated for pumping pressure fluid through conduits 3 and 32 into hydraulic motor 31 for lifting platform 36 over the obstacle.

As the pressure increases in hydraulic motor 31 due to the operation of pump 1, the pressure responsive means 64 places slide 182 in a corresponding position representing the actual pressure in hydraulic motor 31, and shortly before slide 182 arrives in the lowest position representing the maximum pressure, actuator 198 engages switch 199 and closes the same shortly before platform 36 is lifted off the ground by hydraulic lifting motor 31.

In the manner described above, the desired position representing slide 191 and the actual position representing slide 185 are connected by control relay 205 to the ends of winding 146 of the comparison relay 147 so that the level of platform 36 is regulated to the position selected by operation of handle 193. During the lifting of platform 36 over the obstacle, linkage 79, 184 performs a corresponding movement so that slide 185 of the actual position representing potentiometer is displaced in a direction corresponding to control of valve 127 for lowering the platform. This counteracts the pressure depending lifting command. In order to render the pressure responsive means 64 immediately effective for controlling the lifting motor 31 upon engagement of platform 36 with an obstacle, the position representing means of the lifting apparatus is disconnected by the open switch 199 and interrupted control circuit 200 to 207, depending on the position of slide 182.

When cutting operations are carried out at a very low level of platform 36 above the ground, that is in the lower range of the position depending regulation, it must be avoided that very small obstacles cause a transition from the position depending regulation automatically to the pressure depending regulation. For this purpose, switch 199 is still closed by actuator 198 when slide 182 has moved out of the position corresponding to the maximum actual pressure. On the other hand, capacitor 203 is connected into the control circuit 202 to 207 which requires a certain time for being fully charged after the closing of switch 199, so that energizing of the relay 205 is delayed, and slides 185 and 191 are connected with each other to influence the valve 127 depending on the position of platform 36 in relation to the frame 33.

In the embodiment of FIG. 1, resistors 188 and 189 are combined to form a resistor 187, but two movable taps 190 and 191 are nevertheless provided.

In the embodiment of FIG. 2, the resistor 242 which is associated with the desired pressure, and a resistor 241 including resistor portion 243 and resistor portion 244 are provided, which can be disconnected from each other, but cooperate with a common movable tap 239 which is moved first along resistor 242, and then along resistors 243 and 244.

The embodiment of FIG. 2 includes hydraulic operating means 1 to 3, 10, 14, 127, cooperating with the hydraulic lifting motor 31 as described with reference to FIG. 1. An actual pressure representing potentiometer 181, 182 is again provided, and controlled by the pressure responsive means 64. An actual platform position representing potentiometer 185, 186 is provided, and operated by the linkage 184, 179, as described. Comparison relay means 147 is also provided as described in FIG. 1 for operating the electromagnetic means 128, 129 by which the valve 127 of the hydraulic operating means is shifted. Other corresponding parts of the embodiments of FIGS. 1 and 2 are also indicated by like reference numerals in FIG. 2.

The embodiment of FIG. 2 is particularly suited for cutting the grain at a level of the cutting platform 36 about 8 inches above the ground. For this purpose, sensing feeler means are movably mounted on the cutting platform 36, and are biased toward the ground for sensing the ground contour. Feelers 219 and 220 are respectively mounted on opposite sides of cutting platform 36 for angular movement about pivots 221, and are biassed toward the ground so that they abut stops 225 when platform 36 is raised to a level in which the feelers can no longer engage the ground and are stopped by stops 225. Within a certain range, feelers 219 and 220 will sense the ground contour and independently operate corresponding Bowden cables 223, 224. The Bowden cables 223, 224 are connected by lost-motion means 226' with the movable tap or slide 226 of a potentiometer 226, 227 which represents the actual feeler position of the feeler 219 or 220 which is more displaced than the other due to an obstacle sensed by it.

The position of slide 226 on resistor 227 will be changed by a feeler engaging an obstacle, and the position of slide 226 will represent the actual position of the feeler means. Resistor 227 is connected to the voltage source 140 between lines 141 and 139, and in parallel with the resistors 181 and 186. The control means include a control relay 205 with the winding 204 controlling an armature 228 with two contact bridges 229 and 230 which, when control switch 199 is open, are in the position illustrated in FIG. 2 in which contact bridge 230 connnects contacts 235 and 236 and thereby the adjacent ends of resistors 242 and 243. At the same time, contacts 231 and 232 are disconnected, and contacts 237 and 238 are also disconnected. Contact 237 is connected with line 139, and contact 238 is connected with the end of resistor 243 which is associated with the desired feeler and platform position. Contact 231 is connected by line 233 with the movable tap 226 of the actual feeler position representing potentiometer 226, 227, and the contact 232 is connected by lines 234 and 145 with one end of winding 146 of the comparison relay 147, the other end of winding 146 being connected by a line 148 with the movable tap 239 which is operated by a handle lever 193 connected thereto by a linkage 240 so that tap 239 can be moved first along the desired pressure representing means 242, then along the desired feeler position representing resistor 243, and finally along thte desired high platform position representing resistor 244.

When platform 36 slides on the ground, and only part of the weight of the platform is sustained by hydraulic motor 31, the actual pressure represented by potentiometer 181, 182 is less than the maximum pressure which is possible, and this pressure can be selected by moving tap 239 along resistor 242 to a position representing the desired pressure acting on the platform sliding on the ground.

When slide 239 is moved along resistor 243, desired positions of the platform 36 can be selected in which feeler means 219, 220 still engage the ground before abutting on stops 225 and perform the sensing function. When platform 36 is to be raised above this level so that the feelers 219, 220 abutting stops 225 do not engage the ground any more, tap 239 is moved by handle 193 along the desired platform position representing resistor 244 so that platform 36 is moved to a position above the level of 8 inches above the ground.

As noted above, resistors 243 and 244 are combined and connected in series, while resistor 242 can be connected with resistor 241 by operation of the control relay 205.

It will be understood that the circuit shown in FIG. 2 can be applied to the apparatus shown in FIG. 1, and that the circuit of the apparatus of FIG. 1, can be modified and used in the apparatus of FIG. 2.

The embodiment illustrated in FIG. 2 operates as follows:

When the driver decides to cut certain grains near the ground, the platform 36 rests on the ground and slides on the same. The driver operates the handle 193 to move slide 239 to the position on resistor 242 corresponding to the pressure desired in the hydraulic lifting motor 31 for sustaining the desired part of the weight of the platform 36 so that only a part of the weight of platform 36 rests on the ground.

Assuming again that the apparatus was at first in the position in which the platform 36 is located at a high level above the ground for being transported, slides 185, 226 and 182 are all in positions in which their respective resistors 186, 227, 181 represent the highest possible value. Slides 226 and 185 are in the illustrated positions, and slide 182 is in the lowest position, not shown in FIG. 2. The slide 239, associated with desired conditions, has been placed by the operator in the position shown in FIG. 2 located between the ends of the desired pressure representing resistor 242. Since slides 239 and 182 are not in corresponding positions, a current flows through lines 145, 148 and winding 146 in the direction from slide 182 to slide 139 which causes movement of armature 149 to connect electromagnetic means 129 to the voltage so that valve 127 is displaced, and fluid is discharged from hydraulic motor 31 through return conduit 14, causing lowering of platform 36 until the same rests on the ground, partly supported by hydraulic motor 31 in which the pressure selected by operation of handle 193 and tap 239 is present.

During the lowering of platform 36, slides 185 and 226 are displaced by members 226' and linkage 184, respectively, from the position representing the highest actual position to the other end position representing the lowest actual position of platform 36 in which the respective resistors 186 and 227 are disconnected by taps 185 and 226.

Linkage 72 of pressure responsive means 64 moves slide 182 along resistor 181 until there is no voltage difference between slides 182 and 239 representing the actual and desired pressure in hydraulic motor 31. When slides 182 and 239 are in corresponding positions, armature 149 returns to its normal intermediate position, and valve 127 assumes its normal neutral position in which hydraulic motor 31 neither discharges, nor receives fluid.

Due to the displacement of slide 182 out of its end position, switch 199 of circuit 200 to 207 is open, so that the actual feeler position representing potentiometer 227, 226 and the actual platform position representing potentiometer 185, 186 are disconnected. The resistors 242 and 241, are then connected in series by contact bridge 230, contacts 235, 236 and lines 245, 246, 247.

Assuming that the driver selects a level of the platform within the range of feeler regulation, the desired height of the platform is selected by operation of handle 193 which moves slide 239 along resistor 243 to a position representing the desired height of the platform within the limits of the range of the feelers 219, 220, so that the same engage the ground, while platform 36 is raised above the ground, for example 8 inches high.

At first, there is a voltage differential between slides 239 and 182, and a current flows between slide 239 and slide 182, which causes a displacement of valve 127 to the left so that fluid is supplied to hydraulic motor 31 and the platform is raised.

At the same time, piston and piston rod 72 and linkage 183 displace slide 182 in the direction toward higher pressure, and shortly before slide 182 reaches its end position representing the highest actual pressure, slide 182 moves actuator 198 to a position closing control switch 199.

The control circuit 200 to 207 is connected with the voltage source 240, so that the current flows through lines 141, 200, 202 to capacitor 203, and from there to winding 204 of control relay 205 so that a magnetic field is produced which moves armature 228 out of winding 204 so that contact bridge 229 connects contacts 231, 232 while contact bridge 230 interrupts the connection between contacts 235 and 236, while the contact pair 237, 238 is connected.

In this position of the control relay 205, slide 239, which is associated with desired values, is connected by line 148, winding 146, lines 145, 234 and 233 with slide 226 on the resistor 227 of the feeler position representing potentiometer. Resistor 242, associated with the desired and selected pressure, is disconnected due to the interruption between contacts 235 and 236. The resistor portions 243, 244 of the resistor 241 are connected by lines 246 and 248 directly with the grounded line 139.

A voltage differential occurs between the two slides 239 and 226 so that current flows from slide 239 to slide 226.

Valve 127 remains in its position for causing flow of pressure fluid to the hydraulic motor 31 so that the same lifts platform 36 to a higher position. Feelers 219, 220 are biassed to turn away from platform 36, and displace through Bowden cables 223, 224, and member 226', the slide 226 along resistor 227. When platform 36 is raised to the height selected by handle 193, feelers 219, 220 have a relative position with respect to platform 36 in which the slide 226 on resistor 227 is disposed in a position corresponding to the position of slide 239 on resistor 243 since the actual feeler position corresponds to the desired and selected position of the platform. Between slides 239 and 226 no current flows any more, and winding 146 is de-energized so that valve 127 assumes its normal neutral position in which hydraulic motor 31 is closed, and platform 36 is held at the selected level.

When feelers 219, 220 engage an obstacle, they are displaced toward platform 36 and shift through Bowden cables 223, 224 the slide 226 of the potentiometer 226, 227 which represents the actual feeler and platform position. Platform 36 is lifted over the obstacle, while feelers 219, 220 return to the positions selected by operation of handle 193. Behind the obstacle, feelers 219, 220 return to the positions selected by operation of handle 193. Behind the obstacle, feelers 219, 220 are free to move away from platform 36 toward the ground, to the extent permitted by stop 225, so that slide 226 is displaced on resistor 227 as compared with the position of slide 239, and the current flows through winding 146 causing operation of valve 127 so that fluid is discharged from hydraulic motor 31, and platform 36 moves downward until feelers 219, 220 are again in a position corresponding to the desired position of the platform.

When feelers 219, 220 enter a hole or depression in the ground, slide 226 is displaced relative to resistor 227 through Bowden cables 223, 224 and connecting means 226', so that a voltage differential is produced between slides 226 and 239 and the current flows from slide 226 to slide 239 through winding 146 so that valve 127 is shifted by electromagnetinc means 129 to the position in which hydraulic motor 31 is connected to return conduit 14, and platform 36 moves downward. When feelers 219, 220 have passed the depression in the ground, slide 226 is again placed in an actual position corresponding to the desired and selected position so that platform 36 is again carried at the desired height above the ground.

If platform 36 encounters an obstacle, a part of the weight of the platform is supported by the ground, so that the pressure in the cylinder of hydraulic motor 31 drops, and pressure responsive means 64 responds to this pressure drop to displace slide 182 of the actual pressure representing means 181, 182. When slide 182, linkage 183, and actuator 198 move out of the end position corresponding to the maximum pressure, control switch 199 opens, and circuit 200 to 207 is disconnected so that the magnetic field of winding 204 collapses, and armature 228 moves back into winding 204, whereby contact pairs 231, 232 and 237, 238 are interrupted so that the actual feeler position representing potentiometer 226, 227 and the actual platform position representing potentiometer 185, 186 are disconnected from winding 146. Pair of contacts 235, 236 is again connected by contact bridge 229, so that the desired pressure representing resistor 242 is again connected into the circuit. Between slides 239 and 182 there is a voltage differential, so that current flows from slide 239 to slide 182 causing a displacement of valve 127 by electromagnetic means 128 for supplying pressure fluid to hydraulic motor 31 so that the platform is raised over the obstacle. During this movement of the platform, feelers 219, 220 turn farther away from platform 36 which would cause a lowering of platform 36, but this is not possible as long as control switch 199 is open, and the actual pressure representing slide 182 is not in the predetermined position shortly under the position for the highest actual pressure. Only when platform 36 has been raised over the obstacle and is again completely carried by lifting motor 31, the pressure responsive means 64 closes switch 199 by actuator 198 so that, as described above, the slide 226 of the actual feeler position representing potentiometer is again connected with slide 239, and platform 36 is raised back to the selected height, and maintained at this higher level.

The control of the position of the platform above the limited range of the feelers 219, 220 takes place in a similar manner. Slides 226 and 185 are both connected with line 233, and resistors 243 and 244 are connected directly in series, so that the comparison of the voltages at the potentiometer takes place as explained above.

Figure 3:
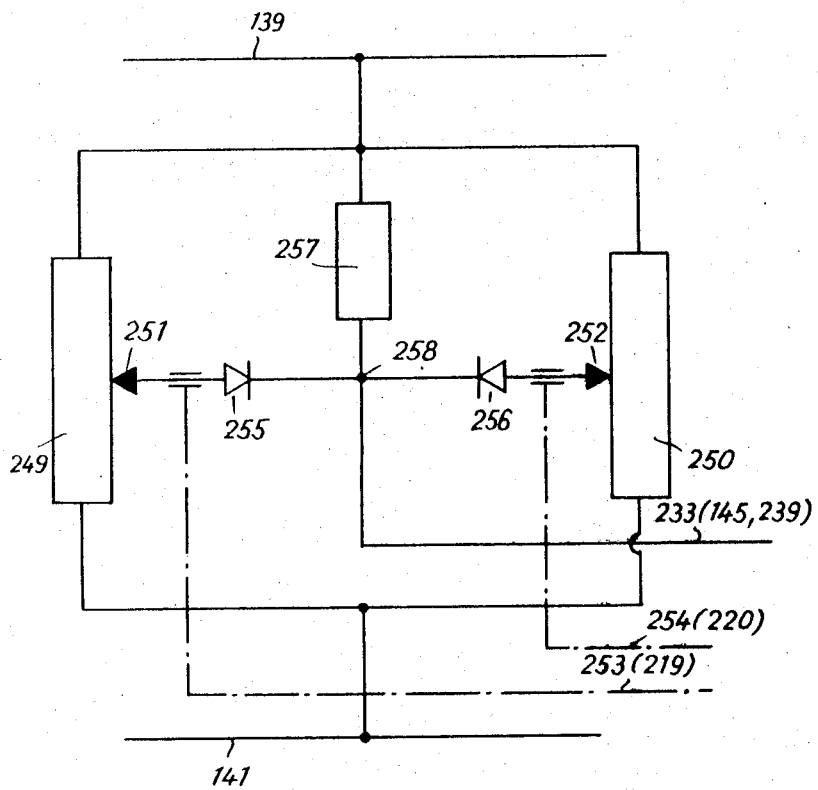
FIG. 3 is a diagram illustrating a modified electric circuit for the control apparatus shown in FIG. 2.

FIG. 3 shows a modification of the means by which the feelers 219, 220 control slide 226 of the actual feeler position representing potentiometer 226, 227. Corresponding parts are indicated in FIG. 3 and FIG. 2 by the same reference numerals.

Two potentiometer resistors 249 and 250 are connected in parallel between the line 141 and the grounded line 139 and to the voltage of voltage source 140. Slides 251, 252 are respectively connected with linkage means 253 and 254 which are respectively connected to feelers 219 and 220 in the same manner as described with reference to the Bowden cables 223 and 224 in FIG. 2. Each slide 251, 252 is connected by the diode 255, 256 to a line 233 containing a resistor 257 and being connected at the point 258 to the diodes 255 and 256, and to a line 233 whose connection to the control relay 205 has been explained with reference to FIG. 2. Resistor 257 is connected with the grounded line 139. Resistor 257 is of such a magnitude that at the point 258, there is always a potential which is lower than the lowest potential of resistor 243 and tap 239.

While during the platform adjustment in the working position in which the feelers are effective, as described with reference to FIG. 2, the adjusting member 226' by which slide 226 is adjusted, is connected by Bowden cables 223, 224 to the two feelers 219 and 220 so that only the feeler 219 or 220 is effective which has been pressed closer to the platform by the ground contour, in the modified embodiment of FIG. 3, the diodes 255 and 256 have the purpose of transmitting the displacement of the feeler which is more displaced toward the platform. When one of feelers 219 or 220 enters a depressed portion of the ground, the respective slide 251 or 252 is moved along the respective resistor 249 or 250 by the linkage 253 or 254. The respective diodes 255 and 256 prevent a flow of current to the potentiometer representing the actual position of the less displaced feeler, as represented by the potentiometer 226, 227.

In this manner, it is prevented that platform 36 runs against the obstacle on the ground, or is lowered only because one feeler 219 or 220 has made a movement away from platform 36 causing a lowering of the platform.

On the other hand, when the driver selects a higher level of the platform within the limited range of the feelers, slide 239 is displaced by handle 193 in the direction corresponding to lifting of the platform. This causes a greater voltage differential between slide 239 and point 258 of line 233 at the resistor 257, which causes an impulse for displacing valve 127 to the position causing raising of platform 36.

At the same time feelers 219 and 220 turn away from platform 36 and operate the linkages 253 and 254 so that slide 251 and 252 follower at resistors 249 and 250 until they are in positions representing an actual position of the platform corresponding to the selected position of the platform selected at the potentiometer 239, 242.

It is possible to use amplifiers in the circuit of the comparison means 147 which has the advantage that only small voltage differentials between the actual values representing means and the desired values representing means are required for transmitting the regulating pulses. Amplifiers having transistors are particularly suited since they require little energy.

It will be understood that each of the elements described above, or two or more together, may also find a useful application in other types of control apparatus for the cutting platform of a harvesting machine differing from the types described above.

While the invention has been illustrated and described as embodied in a control apparatus for the cutting platform of a harvesting machine provided with control means operated by actual pressure representing means to connect actual position representing means and desired position representing means with comparison means when the actual pressure representing means represents a predetermined pressure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Control apparatus for the cutting platform of a harvesting machine comprising a movable cutting platform means mounted for up and down movement; hydraulic motor means for raising said platform means; hydraulic operating means having a first position for supplying fluid to said hydraulic motor means for raising said platform means, a second position for discharging fluid from said hydraulic motor means for lowering said platform means, and a normal third position in which no fluid is supplied to, or discharged from, said hydraulic motor means; actual pressure representing means responsive to the pressure in said hydraulic motor means; desired pressure representing means manually settable for representing a pressure desired in said hydraulic motor means up to a maximum pressure; actual position representing means connected with said platform means and responsive to the positions of the same; desired position representing means manually settable to a position desired of said platform means; comparison means for comparing the condition of said actual pressure representing means with the condition of said desired pressure representing means, and controlling said hydraulic operating means to control said hydraulic motor means until the actual pressure in said motor means is equal to the desired pressure selected by manual operation of said desired pressure representing means whereupon said hydraulic operating means is de-activated by said comparison means; and control means operated by said actual pressure representing means to connect said actual position representing means and said desired position representing means with said comparison means when said actual pressure representng means represents a predetermined pressure which is a given amount less than the maximum pressure to which said desired pressure representing means is manually set so that said comparison means compares the actual position of said platform means with the desired position of the same and controls said hydraulic operating means to actuate said hydraulic motor means until the actual position of said platform means is the same as the desired position selected by operation of said desired position representing means.

2. Control apparatus as claimed in claim 1 wherein said control means includes a control switch operated by said actual pressure representing means to move to an actuated position when the same responds to said predetermined pressure, and relay means controlled by said control switch in its normal position to connect said actual pressure representing means and said desired pressure representing means with said comparison means, and controlled by said control switch in said actuated position to connect said actual position representing means and said desired position representing means with said comparison means.

3. Control apparatus as claimed in claim 2 wherein said actual pressure and desired pressure representing means, and said actual position and desired position representing means are electrical and produce different electric voltage differentials when the actual pressure and desired pressure, and the actual position and the desired selected position, of said platform means are different; wherein said comparison means is electrical and includes electromagnetic means responding to said voltage differentials to move said hydraulic operating means between said first and second positions.

4. Control apparatus as claimed in claim 2 wherein said relay means includes a winding, wherein said control means includes an electric delaying means connected between said control switch and said winding, and a resistor connected in series with said winding.

5. Control apparatus as claimed in claim 2 wherein said actual pressure representing means include a pressure responsive means communicating with said hydraulic motor means and varying its length when responding to different pressures, and a first potentiometer having a first movable tap operated by said pressure responsive means; wherein said actual position representing means include a second potentiometer having a second movable tap, and a linkage connecting said second tap with said platform means; wherein said desired pressure representing means include a third potentiometer having a third movable tap; wherein said desired position representing means include a fourth potentiometer having a fourth movable tap; and wherein said comparison means includes a relay having a winding selectively connected by said control means with said taps.

6. Control apparatus as claimed in claim 1 wherein said platform means includes a cutting platform and sensing feeler means movably mounted on said platform biassed toward the ground for sensing the ground contour within a limited range; wherein said actual position representing means include actual feeler position representing means connected with said feeler means and following the movements of the same and actual platform position representing means; wherein said desired position representing means include a desired feeler position representing means correlated with cutting positions of said platform within the operational range of said feeler means, and a desired platform position representing means correlated with high platform positions above the operational range of said feeler means; wherein said control means connects said actual feeler position representing means and said desired feeler position representing means with said comparison means when said actual pressure representing means represents said predetermined pressure after a desired cutting position, and thereby a desired feeler position, selected on said desired feeler position representing means; and wherein said control means connects said actual platform position representing means and said desired platform position representing means with said comparison means when said actual pressure representing means represents said predetermined pressure after a desired high position of said platform was selected by said desired platform position representing means.

7. Control apparatus as claimed in claim 6 wherein said feeler means include two feelers mounted on said platform for independent movement, and two linkages connecting said feelers with said actual feeler position representing means and including means whereby said actual feeler position representing means represents the greater deviation of the deviations of said two feelers caused by the ground contour.

8. Control apparatus as claimed in claim 6 wherein said actual pressure representing means, said desired pressure representing means, said actual platform position representing means, said actual feeler position representing means, said desired feeler position representing means, and said desired platform position representing means are electrical and produce different electric voltage differentials when the actual pressure and the desired pressure, and the actual platform position and the desired selected platform and feeler positions, are different; wherein said control means includes a switch operated by said actual pressure representing means at said predetermined pressure, and control relay means having contacts controlled by said switch; and wherein said comparison means is electrical and includes electromagnetic means responding to said voltage differentials to move said hydraulic operating means to said first, second, and third positions.

9. Control apparatus as claimed in claim 8 wherein said feeler means include two feelers mounted on said platform for independent movement; wherein said actual feeler position representing means includes two potentiometers having resistors connected in parallel and taps; means connecting said two feelers with said taps, respectively; conductor means connected with said contacts of said relay means; and two diodes respectively connecting said two taps with said conductor means whereby when the tap which is more displaced by one feeler than the other tap is by the other feeler produces a greater voltage differential, the same is used in said electrical comparison means.

10. Control apparatus as claimed in claim 8 wherein said desired pressure representing means includes a first resistor, wherein said desired feeler position representing means and said desired platform position representing means include a second resistor, a common tap manually movable over said first and second resistors and electrically connected with said comparison means; and wherein said control relay means disconnects said second resistor while said tap is on said first resistor, and disconnects said first resistor while said tap is on said second resitor after actuation of said switch by said actual pressure representing means.

11. Control apparatus as claimed in claim 1 wherein said desired pressure representing means includes a first resistor and a first tap movable along the same; wherein said desired position representing means includes a second resistor and a second tap movable along the same; and comprising manually operated means connected with said first and second taps for moving the same at least partly together over said first and second resistors.

12. Control apparatus as claimed in claim 11 wherein said manually operated means include a handle, a linkage connected with said handle and carrying said second tap, and a spring connecting said linkage with said first tap; and comprising a stop for stopping said first tap on said first resistor in an end position representing the desired maximum pressure after movement together with said second tap so that said spring is deformed while said handle is further operated with said linkage to move said second tap further along said second resistor for representing desired platform positions.

13. Control apparatus as claimed in claim 12 wherein said linkage includes adjustable means for mounting said second tap on said linkage so that the relative position of said first and second taps while moving together can be adjusted.

References Cited

UNITED STATES PATENTS 3,568,420    3/1971    Hofer et al. _____ 56—208

ROBERT PESHOCK, Primary Examiner

J. A. OLIFF, Assistant Examiner

U.S. Cl. X.R.

56—10.8, 11.9, 15.9, 208, DIG 15